United States Patent Office 3,849,414
Patented Nov. 19, 1974

3,849,414
PROCESS FOR PREPARING 1,5 - DIACETYL - 3,7-ENDOMETHYLENE - 1,3,5,7-TETRAAZACYCLO-OCTANE
Victor I. Siele, Succasunna, and Everett E. Gilbert, Morristown, N.J., assignors to the United States of America as represented by the Secretary of the Army
No Drawing. Filed Sept. 17, 1973, Ser. No. 397,525
Int. Cl. C07d 55/14
U.S. Cl. 260—248 NS
9 Claims

ABSTRACT OF THE DISCLOSURE 1,5 - Diacetyl-3,7-endomethylene-1,3,5,7-tetraazacyclooctane is prepared by reacting hexamethylenetetramine with ketene in aqueous medium, preferably in the presence of an added acid binding agent.

BACKGROUND OF THE INVENTION 1,5 - Diacetyl - 3,7-endomethylene-1,3,5,7-tetrazacyclooctane (DAPT) is useful as an intermediate for producing HMX (1,3,5,7 - tetranitro - 1,3,5,7-tetraazacyclooctane), which is the most powerful non-atomic explosive in military use. In the past DAPT has been prepared by reacting hexamethylenetetramine with acetic anhydride under anhydrous conditions, but the yields were always poor. Thus, Dominikewicz (Chem. Abstracts 30, 1029 (1936) obtained a 30% yield in anhydrous ether. G. C. Bassler ("The Chemistry of Cyclonite," PhD Thesis 1943, Pennsylvania State College, p. 175) reported 10-19% yields in chloroform, while Aristoff and coworkers (Can. J. Res. 27B, 520 (1949)) obtained a 6.5% yield using no solvent. An improved process, which comprises carrying out the reaction of acetic anhydride and hexamethylenetetramine in the presence of water, whereby higher yields of DAPT are obtained, is the subject of copending U.S. Patent Application, Ser. No. 394,238, filed Sept. 4, 1973, "Process For Preparing 1,5-Diacyl-3,7-endomethylene-1,3,5,6-tetraazacyclooctanes," Victor I. Siele, Inventor.

SUMMARY OF THE INVENTION

In accordance with this invention there is provided a novel process for preparing DAPT, which comprises reacting hexamethylenetetramine (1,3,5 - tetraazatricyclo (3,3,1,1)decane), hereinafter also referred to as hexamine, with ketene in aqueous medium, advantageously in the presence of an additional acid binding agent. The reaction is schematically represented as follows:

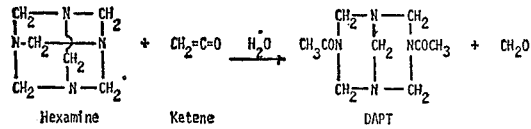

Hexamine  Ketene  DAPT

DESCRIPTION OF THE PREFERRED EMBODIMENTS

The following examples illustrate the specific embodiments of the process of the present invention. However, it is to be understood that the examples are merely illustrative and in no way limit the invention. The parts in the examples are by weight.

Example 1

Hexamethylenetetramine (15 parts, 0.1 mole) and sodium acetate trihydrate (34 parts, 0.25 mole) were dissolved in water (175 parts), and the solution was cooled to about 15–20° C. Ketene gas (39.5 parts, 0.94 mole) was introduced gradually during two hours under atmospheric pressure into the solution with agitation while maintaining the temperature at 20° C. When the addition was complete, the clear solution thus obtained was agitated at 20° C. for 2 hours to ensure completion of the reaction (aging time). The solution was then evaporated to dryness in vacuo and the solid residue was extracted with 1050 parts of chloroform. The chloroform extract was evaporated to dryness, yielding 27.1 parts of solid product representing crude DAPT. The crude product was purified by recrystallization from acetone, yielding 13.5 parts of DAPT of melting point 188–190° C., which corresponds with 64% of the theoretical yield from hexamethylenetetramine. The NMR and infrared spectra correspond with the structure of DAPT.

The ketene used in the example was obtained by cracking acetone according to the procedure published in J. Org. Chem. 5, 122 (1940).

Several additional examples were carried out in similar manner except that the proportion of ketene, reaction temperature, etc. were modified. The following table sets forth the reaction conditions and results of these examples as well as of Example 1.

The process of the present invention comprises mixing ketene and hexamethylenetetramine in the presence of water, usually at temperatures up to about 50° C., and then recovering the DAPT produced. The DAPT can be recovered by evaporating the reaction mixture to dryness, and the crude DAPT product thus obtained can be purified by recrystallization from a suitable solvent, e.g. acetone.

The amount of water employed in the reaction can be varied over a wide range. Usually an amount of water sufficient to provide a solution or a stirrable slurry of the hexamethylenetetramine is employed. As little as about one mole of water per mole of hexamethylenetetramine can be employed in the present process. Also, the water can be employed together with an inert volatilizable solvent or diluent, such as acetone, if desired.

| Example | Hexamine (moles) | Water (parts) | Additive | Additive (moles) | Ketene (moles) | Temperature (° C.) | Addition time (minutes) | Aging time (minutes) | DAPT (parts) | DAPT melting point (° C.) | DAPT yield (percent theory) |
|---|---|---|---|---|---|---|---|---|---|---|---|
| 1 | 0.1 | 175 | CH₃COONa·3H₂O | 0.25 | 0.94 | 20 | 120 | 120 | 13.5 | 188–190 | 64 |
| 2 | 0.1 | 175 | CH₃COONa·3H₂O | 0.25 | 0.94 | 10 | 120 | 90 | 11.5 | 188–190 | 54 |
| 3 | 0.1 | 175 | CH₃COONH₄ | 0.25 | 0.94 | 15 | 120 | 90 | 11.5 | 188–190 | 54 |
| 4 | 0.1 | 175 | None | | 0.94 | 5 | 120 | 90 | 10.6 | 185–190 | 50 |
| 5 | 0.1 | 175 | None | | 0.94 | 20 | 120 | 60 | 12.4 | 187–190 | 58 |
| 6 | 0.1 | 175 | None | | 0.94 | 30 | 120 | 60 | 9.3 | 187–190 | 44 |
| 7 | 0.1 | 175 | None | | 0.47 | 5 | 60 | 60 | 8.5 | 184–190 | 40 |
| 8 | 0.1 | 175 | None | | 1.41 | 20 | 180 | 60 | 8.4 | 187–190 | 39 |

Although two moles of ketene per mole of hexamethylenetetramine are theoretically required to produce DAPT, an excess over this amount, e.g. 4–10 moles per mole of hexamethylenetetramine, is usually employed to ensure a more complete utilization of the hexamethylenetetramine and thereby promote higher yields of DAPT as well as compensate for any loss of ketene. The ketene gas can be gradually introduced and reacted with the hexamethylenetetramine in the presence of water under ordinary atmospheric pressure. The present process can also be conducted advantageously under superatmospheric pressures, e.g. up to 50 p.s.i., for example, by pressing the ketene into a stirring autoclave containing the aqueous hexamine.

The present process is usually effected at a temperature between about 0° C. and 50° C., and preferably below 30° C. At temperatures below 50° C. the formation of by-products is minimized even when a large excess of ketene over that theoretically required to form DAPT is employed. Reaction temperatures below 0° C., e.g. —20° C. can also be employed and are within the scope of the present process; but they are less preferred, since operation at such low temperatures requires costly cooling. The use of reaction temperatures above 50° C. promotes side reactions with consequent increase in by-product formation and lower yields and purity of DAPT, and is therefore less desired.

The time required for completion of the acylation reaction can be varied widely and depends on a number of factors, such as the reaction temperature, amount of ketene, and especially the rate of addition of ketene to hexamethylenetetramine.

Although hexamethylenetetramine is a base which can function as an acid binding agent, it is generally advantageous to carry out the reaction of ketene and hexamethylenetetramine in an aqueous medium according to the present process in the presence of an additional acid binding agent, such as for example, a hydroxide, carbonate, bicarbonate or acetate of an alkali metal, e.g. sodium, potassium or lithium, ammonium hydroxide, ammonium carbonate, etc. It is especially advantageous to carry out the present process in the presence of an inorganic ammonium compound, e.g. ammonium hydroxide, -carbonate, -acetate, etc., since it has been found that the ammonium compound reacts with the formaldehyde generated in the reaction to form additional hexamethylenetetramine in situ, which reacts with ketene and thereby increases the yield of DAPT.

It is known that ketene reacts with primary or secondary amines to form amides as follows:

$$R_2NH + CH_2CO \rightarrow R_2NCOCH_3$$

(Fieser and Fieser, "Reagents for Organic Synthesis," vol. 1, pp. 529–530). However, as far as we are aware, the reaction of ketene with a tertiary amine such as hexamethylenetetramine is novel.

The nature of the reaction or reactions of ketene with hexamethylenetetramine in the presence of water according to the present process is not exactly known. It is known that ketene reacts slowly with water to form acetic acid. It is also known that the reaction of ketene with acetic acid to form acetic anhydride requires anhydrous conditions. Therefore, it is doubtful that the reaction proceeds via acetic anhydride in the present process, since a large amount of water can be present in the reaction mixture.

It is believed that the reactions in the present process involve elimination of a methylene group from hexamethylenetetramine, whereby in the presence of water the methylene group is converted to formaldehyde and two tertiary amino groups involved are converted into secondary amino groups, which react with ketene to form DAPT.

It is evident from the foregoing that the invention provides a valuable process for producing DAPT from hexamethylenetetramine and ketene. Further, it was not obvious that by reacting ketene with hexamethylenetetramine in the presence of water according to the present process, it is possible not only to eliminate the use of acetic anhydride but also to produce DAPT in considerably higher yields than those obtained by prior art methods, wherein acetic anhydride is reacted with hexamethylenetetramine.

We claim:

1. A process for preparing 1,5-diacetyl-3,7-endomethylene-1,3,5,7-tetraazacyclooctane which comprises reacting hexamethylenetetramine with ketene in the presence of water.

2. The process according to claim 1, wherein the reaction is carried out at a temperature between about 0° C. and 50° C.

3. The process according to claim 1, wherein the reaction is carried out in the presence of an additional acid binding agent.

4. The process according to claim 3, wherein the acid binding agent is an alkali metal hydroxide, -carbonate, -bicarbonate or -acetate.

5. The process according to claim 1, wherein the reaction is carried out in the presence of an inorganic ammonium compound.

6. The process according to claim 5, wherein the ammonium compound is ammonium acetate.

7. The process according to claim 1, wherein the reaction is carried out at a temperature below 30° C. and the amount of ketene is at least 4 moles per mole of hexamethylenetetramine.

8. The process according to claim 7, wherein the reaction is carried out in the presence of an additional acid binding agent.

9. The process according to claim 1, wherein the amount of water is in excess of about one mole per mole of hexamethylenetetramine.

References Cited

Dominikiewicz, Chemical Abstracts, vol. 30, 1029 (1936).

Aristoff et al., Can. J. Res., 27B, 520 (1949).

JOHN M. FORD, Primary Examiner